(12) United States Patent
Busch et al.

(10) Patent No.: US 8,400,910 B1
(45) Date of Patent: Mar. 19, 2013

(54) ASSOCIATED TUNNELS TERMINATING ON DIFFERENT PACKET SWITCHES AND RELAYING PACKETS VIA DIFFERENT TUNNEL COMBINATIONS

(75) Inventors: Dackary Ronald Busch, Veradale, WA (US); Asheesh Jadav, Sunnyvale, CA (US)

(73) Assignee: World Wide Packets, Inc., Spokane Valley, WA (US)

( * ) Notice: Subject to any disclaimer, the term of this patent is extended or adjusted under 35 U.S.C. 154(b) by 464 days.

(21) Appl. No.: 11/769,358

(22) Filed: Jun. 27, 2007

Related U.S. Application Data

(60) Provisional application No. 60/923,405, filed on Apr. 13, 2007.

(51) Int. Cl.
*H04L 1/22* (2006.01)
(52) U.S. Cl. ......................................... 370/217; 370/400
(58) Field of Classification Search .......... 370/216–218, 370/221, 225, 400, 409
See application file for complete search history.

(56) References Cited

U.S. PATENT DOCUMENTS

| | | | | |
|---|---|---|---|---|
| 7,061,942 | B2 * | 6/2006 | Noronha et al. | 370/537 |
| 7,590,054 | B1 * | 9/2009 | Holness et al. | 370/225 |
| 2003/0223358 | A1 * | 12/2003 | Rigby et al. | 370/218 |
| 2004/0151181 | A1 * | 8/2004 | Chu et al. | 370/392 |
| 2007/0014290 | A1 * | 1/2007 | Dec et al. | 370/390 |
| 2007/0076719 | A1 * | 4/2007 | Allan et al. | 370/392 |
| 2007/0086333 | A1 * | 4/2007 | Doukai et al. | 370/228 |
| 2007/0086455 | A1 * | 4/2007 | Allan et al. | 370/389 |
| 2008/0031129 | A1 * | 2/2008 | Arseneault et al. | 370/218 |

* cited by examiner

*Primary Examiner* — Kibrom T Hailu
*Assistant Examiner* — Benjamin Lamont
(74) *Attorney, Agent, or Firm* — Clements Bernard PLLC; Christopher L. Bernard; Lawrence A. Baratta, Jr.

(57) ABSTRACT

Packet switch operating methods and packet switches forward a first packet to a first packet switch via an active primary tunnel terminating on the first packet switch. The primary tunnel is associated with an inactive backup tunnel terminating on a different second packet switch. The methods and packet switches also deactivate the primary tunnel, activate the backup tunnel, and forward a second packet to the second packet switch via the activated backup tunnel. Network operating methods relay a first packet to a first one of a plurality of destination packet switches via two or more different tunnels in a first combination. The methods and packets switches also deactivate one of the tunnels of the first combination without deactivating any other tunnel of the first combination and relay a second packet to a second one of the packet switches via two or more different tunnels in a second combination.

36 Claims, 8 Drawing Sheets

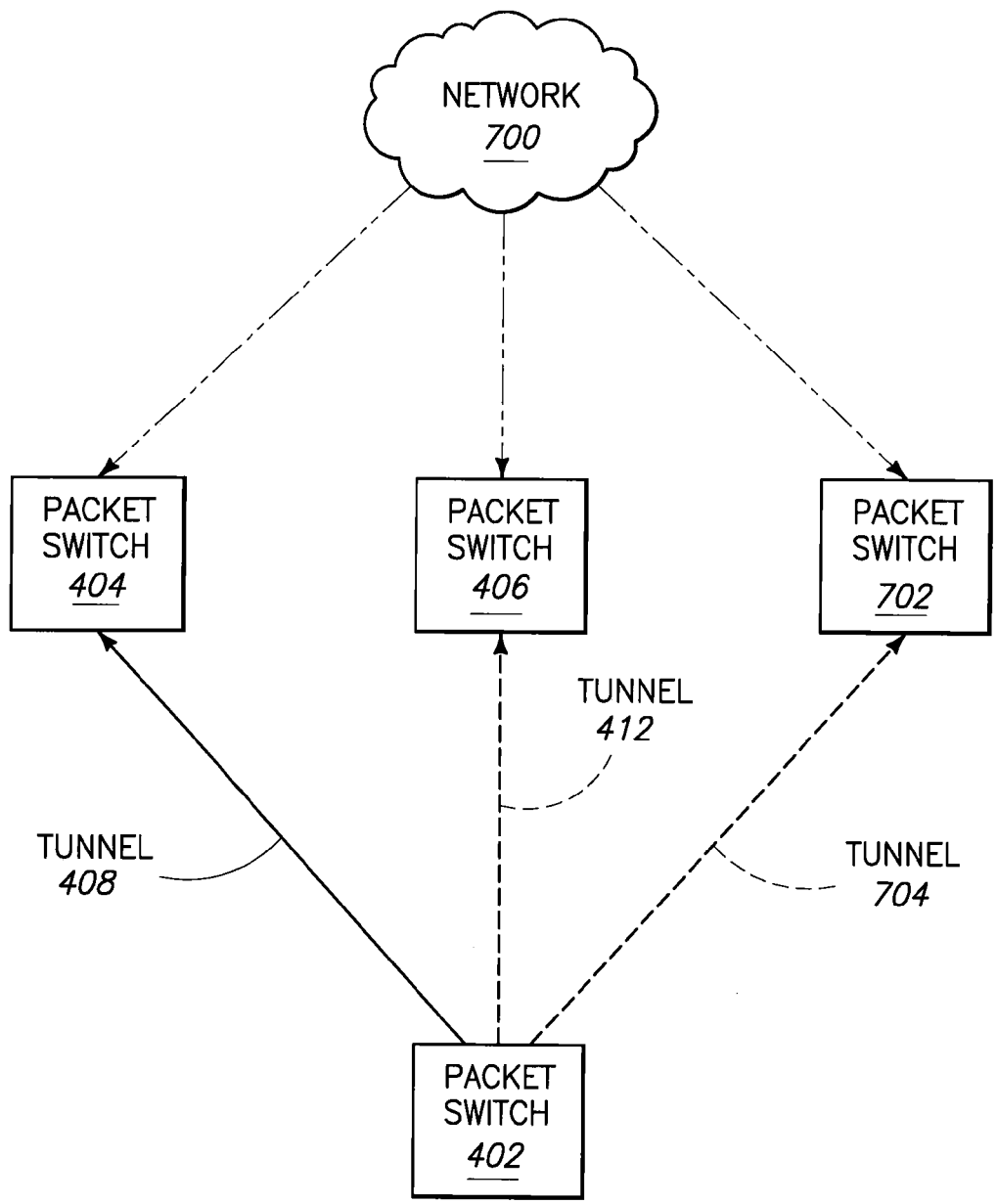

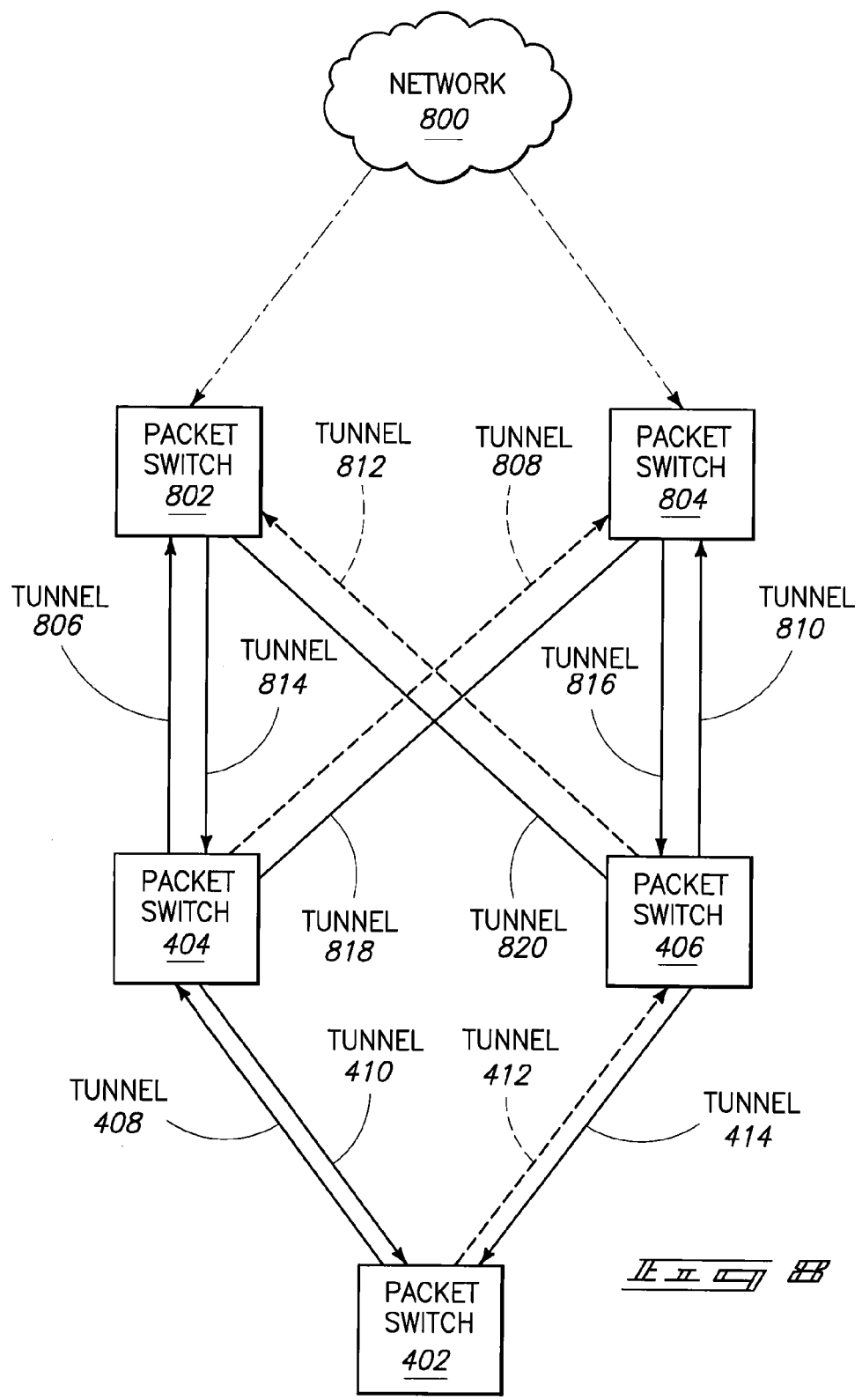

ASSOCIATED TUNNELS TERMINATING ON DIFFERENT PACKET SWITCHES AND RELAYING PACKETS VIA DIFFERENT TUNNEL COMBINATIONS

RELATED PATENT DATA

This application claims the benefit of U.S. Provisional Patent Application Ser. No. 60/923,405, which was filed Apr. 13, 2007, and which is incorporated by reference herein.

TECHNICAL FIELD

The present invention, in various embodiments, relates to associated tunnels terminating on different packet switches and relaying packets via different tunnel combinations.

BACKGROUND OF THE INVENTION

A primary tunnel in an Ethernet network may relay packets from a first packet switch through a network of intermediate packet switches to a second packet switch. Often, one or more backup tunnels associated with the primary tunnel are also provisioned to provide redundancy. Like the primary tunnel, the backup tunnels relay packets from the first packet switch to the second packet switch. However, the backup tunnels may traverse physically different paths than the primary tunnel through the network of intermediate packet switches to reduce the possibility that an outage affecting the primary tunnel will also affect the backup tunnels.

Although the backup tunnels may traverse a physically different path than the primary tunnel, the backup tunnels perform the same function as the primary tunnel, namely to relay packets from the first packet switch to the second packet switch. If the primary tunnel becomes non-operational, for example due to a planned or unplanned outage, the primary tunnel may be deactivated and one or more of the backup tunnels may be activated. Typically, either the primary tunnel or one of the backup tunnels is active at a time, the other tunnels being inactive. An active tunnel may relay packets while an inactive tunnel may be precluded from relaying packets even if the inactive tunnel is capable of relaying packets.

BRIEF DESCRIPTION OF THE DRAWINGS

Preferred embodiments of the invention are described below with reference to the following accompanying drawings.

FIG. 7 illustrates a packet switch network with two backup tunnels.
FIG. 8 illustrates a fifth packet switch network.

DETAILED DESCRIPTION OF THE PREFERRED EMBODIMENTS

Figure 1:
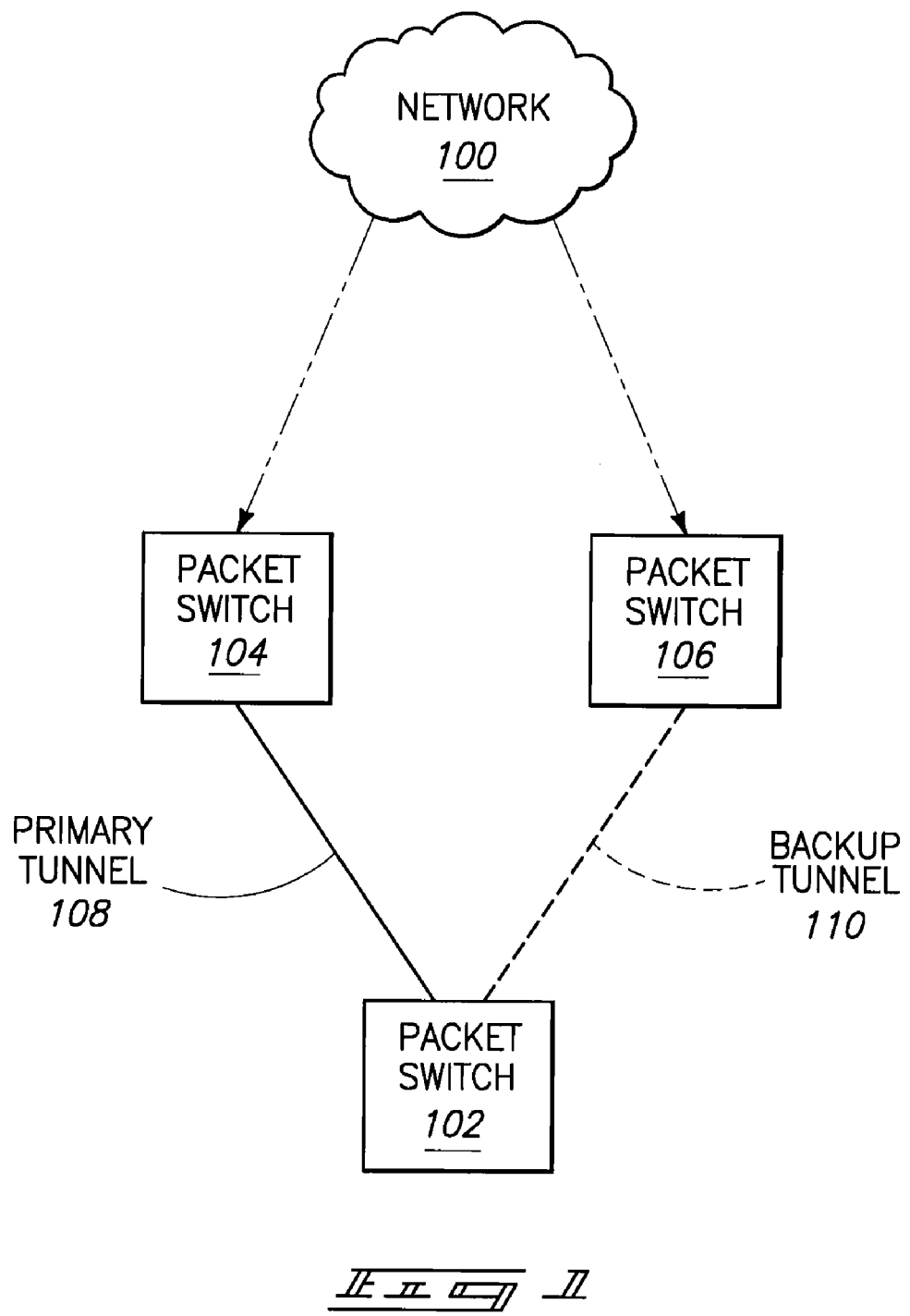
FIG. 1 illustrates a first packet switch network.

According to one aspect of the invention, a packet switch operating method includes forwarding a first packet to a first packet switch via an active primary tunnel terminating on the first packet switch. The primary tunnel is associated with an inactive backup tunnel terminating on a different second packet switch. The method may include preventing the inactive backup tunnel from forwarding packets other than control packets. During periods of time when the primary tunnel is active, the backup tunnel may be inactive and during periods of time when the backup tunnel is active, the primary tunnel may be inactive.

The method further includes deactivating the primary tunnel, which may include preventing packets other than control packets from being forwarded via the primary tunnel, activating the backup tunnel, which may include enabling the backup tunnel to forward control packets and non-control packets, and forwarding a second packet to the second packet switch via the activated backup tunnel.

In some configurations, the fact that the primary tunnel and the backup tunnel terminate on different packet switches may provide increased redundancy compared to a traditional configuration in which a primary tunnel and a backup tunnel both terminate on the same packet switch.

Control packets may include Ethernet continuity check messages (CCMs) conforming to the Institute of Electrical and Electronics Engineers (IEEE) 802.1ag standard. In one configuration, the primary tunnel may be a first primary tunnel and the method may further include receiving one or more CCMs from the first packet switch via a second primary tunnel configured to relay packets only in a single direction away from the first packet switch.

After receiving the one or more CCMs, the method may include determining that either the first primary tunnel or the second primary tunnel is non-operational prior to deactivating the first primary tunnel. The one or more received CCMs may include remote defect indications. In this case, the method may include determining that the first primary tunnel is non-operational.

After receiving the one or more CCMs, the method may include detecting that a CCM loss interval has expired and that during the CCM loss interval no CCMs were received from the first packet switch via the second primary tunnel. Accordingly, the method may include determining that the second primary tunnel is non-operational.

The first packet may include a first transport identifier associated with the primary tunnel and the second packet may include a second transport identifier associated with the backup tunnel. The first transport identifier and the second transport identifier may individually include one of at least one Virtual Local Area Network (VLAN) identifier, at least one Multiprotocol Label Switching (MPLS) label, a provider bridging (PB) identifier, a provider backbone bridging (PBB) identifier, a provider backbone transport (PBT) identifier, a provider backbone bridging traffic engineering (PBB-TE) identifier, and a Virtual Private LAN Service (VPLS) identifier.

The first packet may include a first transport identifier conforming to the IEEE 802.1ah standard and may include a first backbone destination address (B-DA). The second packet may include a second transport identifier conforming to the IEEE 802.1ah standard and may include a second B-DA, the second B-DA being different from the first B-DA. The first transport identifier and the second transport identifier may be identical except for the first B-DA and the second B-DA. In fact, in some cases, both the first packet and the second packet may include a same Ethernet customer destination address (C-DA).

FIG. 1 illustrates a packet switch network 100 including three packet switches 102, 104, and 106. A primary tunnel 108 couples packet switch 102 to packet switch 104 and a backup tunnel 110 couples packet switch 102 to packet switch 106. Tunnels 108 and 110 are associated with each other in that one of tunnels 108 and 110 may be active at a time. An active tunnel is a tunnel that may relay both control packets and non-control packets while an inactive tunnel may only relay control packets. For example, if tunnel 108 is active (able to relay control packets and non-control packets), tunnel 110 may be inactive (able to relay only control packets). Similarly, if tunnel 110 is active, tunnel 108 may be inactive.

Tunnels 108 and 110 may provide redundancy in a packet switch network. For example, in response to tunnel 108 becoming non-operational, packet switch 102 may inactivate tunnel 108 and activate tunnel 110. Tunnel 108 may become non-operational for a number of different reasons including equipment failure, link damage, planned maintenance, power outages, or misconfiguration.

Although packet switch 102 may prevent an inactive tunnel from relaying non-control packets, an inactive tunnel may relay control packets so that the two packet switches at the ends of the inactive tunnel may monitor the operational status of the inactive tunnel. For example, if tunnel 110 is inactive, packet switch 102 may still transmit CCMs to packet switch 106 via tunnel 110. Packet switch 106 may be configured to receive the CCMs from tunnel 110 and to take action if CCMs are not received from tunnel 110 when they are expected to be received. If packet switch 106 does not receive CCMs as expected, packet switch 106 may determine that tunnel 110 is no longer operational.

Similarly, if primary tunnel 108 becomes non-operational and inactive, packet switch 102 may continue to attempt to send CCMs to packet switch 104 via tunnel 108 even though tunnel 108 is non-operational. Consequently, if tunnel 108 becomes operational again, packet switch 104 may detect this change in tunnel 108's operational status upon receiving CCMs from packet switch 102 via tunnel 108. Of course, active tunnels may also relay control packets and CCMs may be used to monitor the status of active tunnels as well as inactive tunnels.

Before sending a packet via tunnel 108, packet switch 102 may modify the packet to have a transport identifier associated with tunnel 108. For example, the transport identifier may be a particular VLAN identifier. In this case, packet switch 102 may modify the packet to have the particular VLAN identifier prior to forwarding the packet via tunnel 108 to packet switch 104. Similarly, tunnel 110 may be associated with a transport identifier. The transport identifier associated with tunnel 110 may be different than the transport identifier associated with tunnel 108. For example, the transport identifier associated with tunnel 110 may also be a VLAN identifier, but may be a VLAN identifier having a different value than the VLAN of the transport identifier associated with tunnel 108.

Of course, other transport identifiers may alternatively be used. In one configuration, a transport identifier associated with tunnel 108 may be a provider backbone transport identifier having a backbone destination address along with other fields specified by the IEEE 802.1ah standard. Tunnel 110 may similarly have a provider backbone transport identifier conforming to the IEEE 802.1ah standard.

In this configuration, the transport identifiers associated with tunnels 108 and 110 may be identical except that the transport identifier associated with tunnel 108 may include a first backbone destination address which is a Medium Access Control (MAC) address associated with packet switch 104 and the transport identifier for tunnel 110 may include a second backbone destination address which is a MAC address associated with packet switch 106.

Tunnel 108 may be bidirectional, relaying packets from packet switch 102 to packet switch 104 and from packet switch 104 to packet switch 102. Alternatively, tunnel 108 may be unidirectional. Similarly, tunnel 110 may be bidirectional or unidirectional.

Associated tunnels 108 and 110 differ from traditional sets of associated tunnels since tunnels 108 and 110 do not relay packets between the same packet switches. Instead, tunnel 108 relays packets between packet switches 102 and 104 and tunnel 110 relays packets between packet switches 102 and 106. In contrast, the tunnels of a typical set of associated tunnels relay packets between the same packet switches. For example, if a typical primary tunnel relays packets between packet switches 102 and 104, backup tunnels associated with the typical primary tunnel also relay packets between packet switches 102 and 104.

It may appear unusual to have tunnels of a set of associated tunnels terminate on different packet switches since ostensibly the purpose of a set of associated tunnels is to reliably relay packets from one packet switch to another packet switch. However, there are scenarios in which it may be useful for the tunnels of a set of associated tunnels to terminate on different packet switches.

Figure 2:
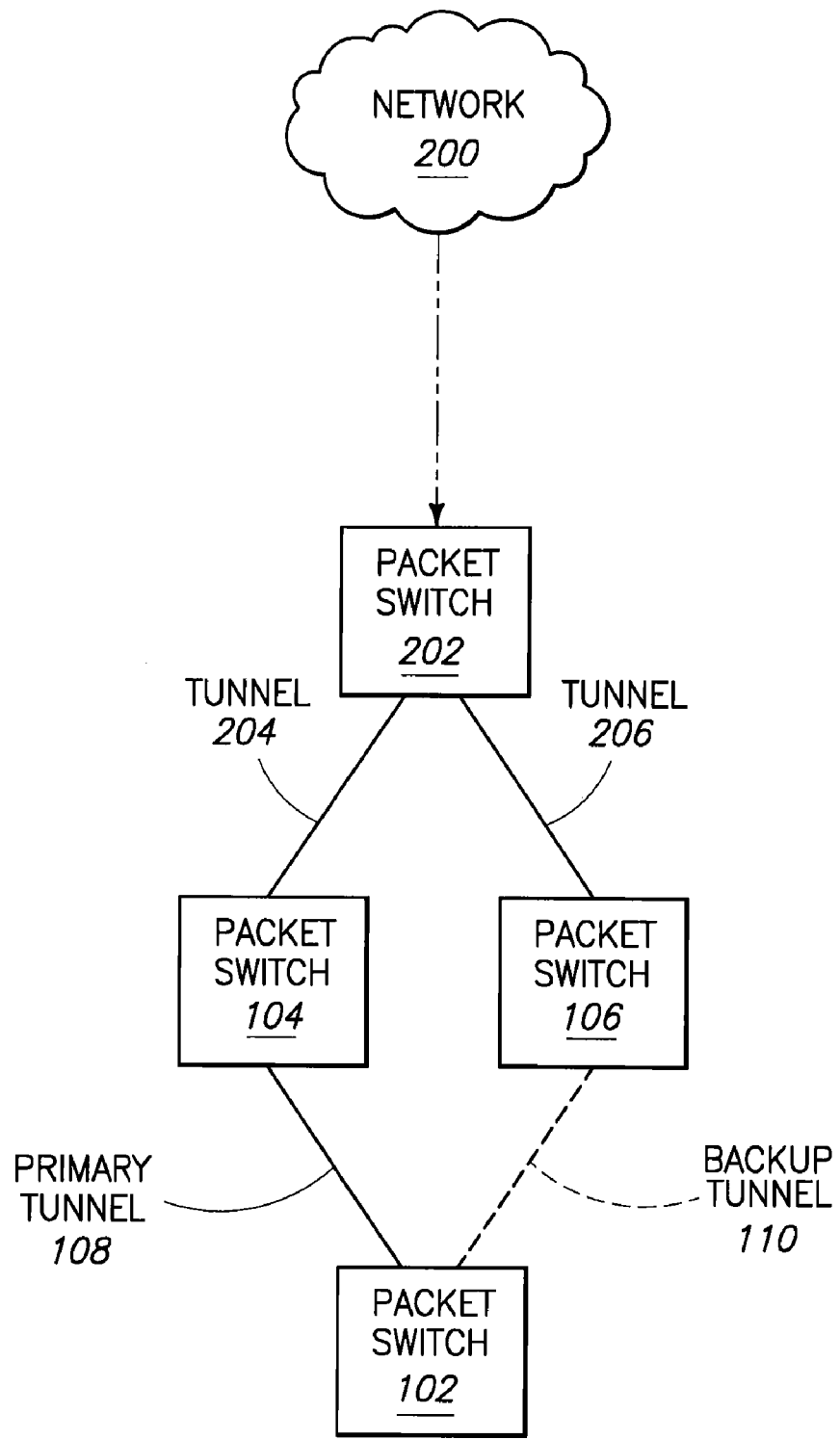
FIG. 2 illustrates a second packet switch network.
Figure 3:
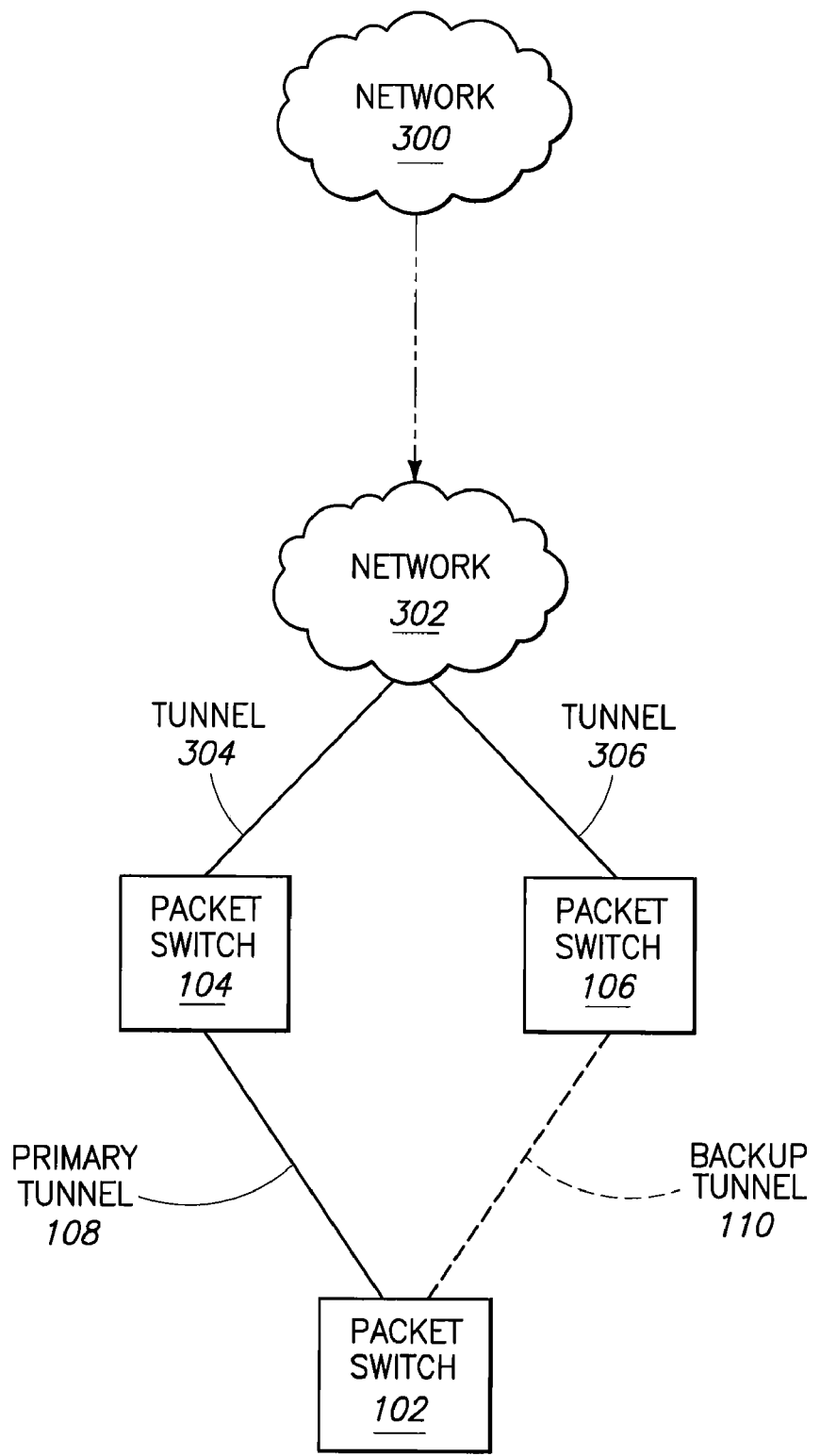
FIG. 3 illustrates a third packet switch network.

For example, a combination of two or more tunnels may be used to relay a packet to a destination packet switch as is illustrated in FIGS. 2 and 3. FIG. 2 illustrates a packet switch network 200. Packet switch network 200 includes packet switches 102, 104, and 106, and tunnels 108 and 110 from packet switch network 100. Packet switch network 200 also includes an additional packet switch 202 and additional tunnels 204 and 206. Packet switch 104 is coupled to packet switch 202 via tunnel 204 and packet switch 106 is coupled to packet switch 202 via tunnel 206.

Tunnel 204 may be a primary tunnel and might not be associated with a backup tunnel. Similarly, tunnel 206 may be a primary tunnel and might not be associated with a backup tunnel. In this configuration, tunnels 204 and 206 are not associated with each other. In other words, tunnel 206 is not a backup tunnel for tunnel 204. Accordingly, tunnels 204 and 206 may simultaneously be active.

Packet switch 102 may forward packets to packet switch 202 via tunnels 108 and 204 if tunnels 108 and 204 are active. Alternatively, if tunnel 108 is inactive (e.g., because it is non-operational), packet switch 102 may forward packets to packet switch 202 via tunnels 110 and 206.

Using a combination of two tunnels to relay a packet may be advantageous because deactivating one of the tunnels of the combination does not necessarily require deactivating the other tunnel of the combination. For example, packets may be relayed from packet switch 102 to packet switch 202 via tunnels 108 and 204. Tunnel 108 may subsequently be deactivated. Thereafter, packet switch 102 may relay packets to packet switch 202 via tunnels 110 and 206.

The fact that tunnel 108 is inactive does not imply that tunnel 204 is also inactive. Instead, tunnel 204 may remain active. In some configurations, packet switch tunnel 204 may relay packets from other tunnels (not illustrated) that, like tunnel 108, terminate on packet switch 104 to packet switch 202. In such configurations, tunnel 204 may advantageously remain active and continue to relay packets from the other tunnels even though tunnel 108 may become non-operational and inactive (e.g., due to an equipment failure, configuration error, or planned outage).

Similarly, as illustrated in FIG. 3, a combination of two or more tunnels may be used to relay packets to a network rather than to a packet switch. FIG. 3 illustrates another packet switch network 300. Packet switch network 300 includes packet switches 102, 104, and 106, and tunnels 108 and 110 of packet switch network 100. Packet switch network 300 also includes a network 302 and additional tunnels 304 and 306. In some configurations, network 302 may be operated by a different network operator than packet switches 102, 104, and 106 and tunnels 304 and 306 may be tunnels that relay packets through network 302 to another network (not illustrated) operated by the network operator responsible for packet switches 102, 104, and 106.

Packet switch 102 may relay packets to network 302 via a combination of tunnels 108 and 304 or via a combination of tunnels 110 and 306. Like tunnels 204 and 206 described above, tunnels 304 and 306 are both primary tunnels that are not associated with backup tunnels and are not associated with each other. In other words, tunnel 306 is not a backup tunnel for tunnel 304. Accordingly, tunnels 304 and 306 may simultaneously be active.

Like tunnel 204, tunnel 304 may advantageously remain active and continue to relay packets to network 302 from other tunnels (not illustrated) even though tunnel 108 may become non-operational and inactive (e.g., due to an equipment failure, configuration error, or planned outage).

The fact that tunnels 108 and 110 terminate on different packet switches may provide increased redundancy compared to a traditional configuration in which a primary tunnel and a backup tunnel both terminate on the same packet switch. In network 300, packet switch 104 may fail completely (e.g., due to a power failure, control plane malfunction, misconfiguration, or planned outage) without precluding packets being relayed from packet switch 102 to network 302 because tunnels 110 and 306 do not rely on packet switch 104. In contrast, in a traditional tunnel configuration, both the primary tunnel and the backup tunnel are affected when a packet switch on which the primary tunnel and the backup tunnel terminate fails.

According to another aspect of the invention, a packet switch network includes a first packet switch, a second packet switch, a third packet switch, a primary tunnel, and a backup tunnel. The primary tunnel has two endpoints. One of the endpoints is located on the first packet switch and the other of the endpoints is located on the second packet switch. The primary tunnel is configured to relay packets between the first packet switch and the second packet switch.

The backup tunnel is associated with the primary tunnel and also has two endpoints. One of the endpoints is located on the first packet switch and the other of the endpoints is located on the third packet switch. The backup tunnel is configured to relay packets between the first packet switch and the third packet switch. The backup tunnel is configured to be active when the primary tunnel is inactive and to be inactive when the primary tunnel is active.

The primary tunnel and the backup tunnel may be configured to forward only control packets when inactive and to forward control packets and packets other than control packets when active. When the backup tunnel is inactive, the second packet switch may be configured to drop packets received from the backup tunnel that are not control packets.

The primary tunnel may be configured to relay only packets having a first transport identifier conforming to the IEEE 802.1ah standard including a first backbone destination address (B-DA) and the backup tunnel may be configured to relay only packets having a second transport identifier conforming to the IEEE 802.1ah standard including a second B-DA, the first B-DA being different than the second B-DA. In some cases, the first transport identifier and the second transport identifier may be identical except for the first B-DA and the second B-DA.

The packet switch network may also include one or more intermediate packet switches. The intermediate packet switches may be configured to relay the primary tunnel between the first packet switch and the second packet switch without terminating the primary tunnel. The primary tunnel may be configured to prevent packets relayed by the primary tunnel from exiting the primary tunnel at a packet switch other than the second packet switch, for example at one of the intermediate packet switches.

Figure 4:
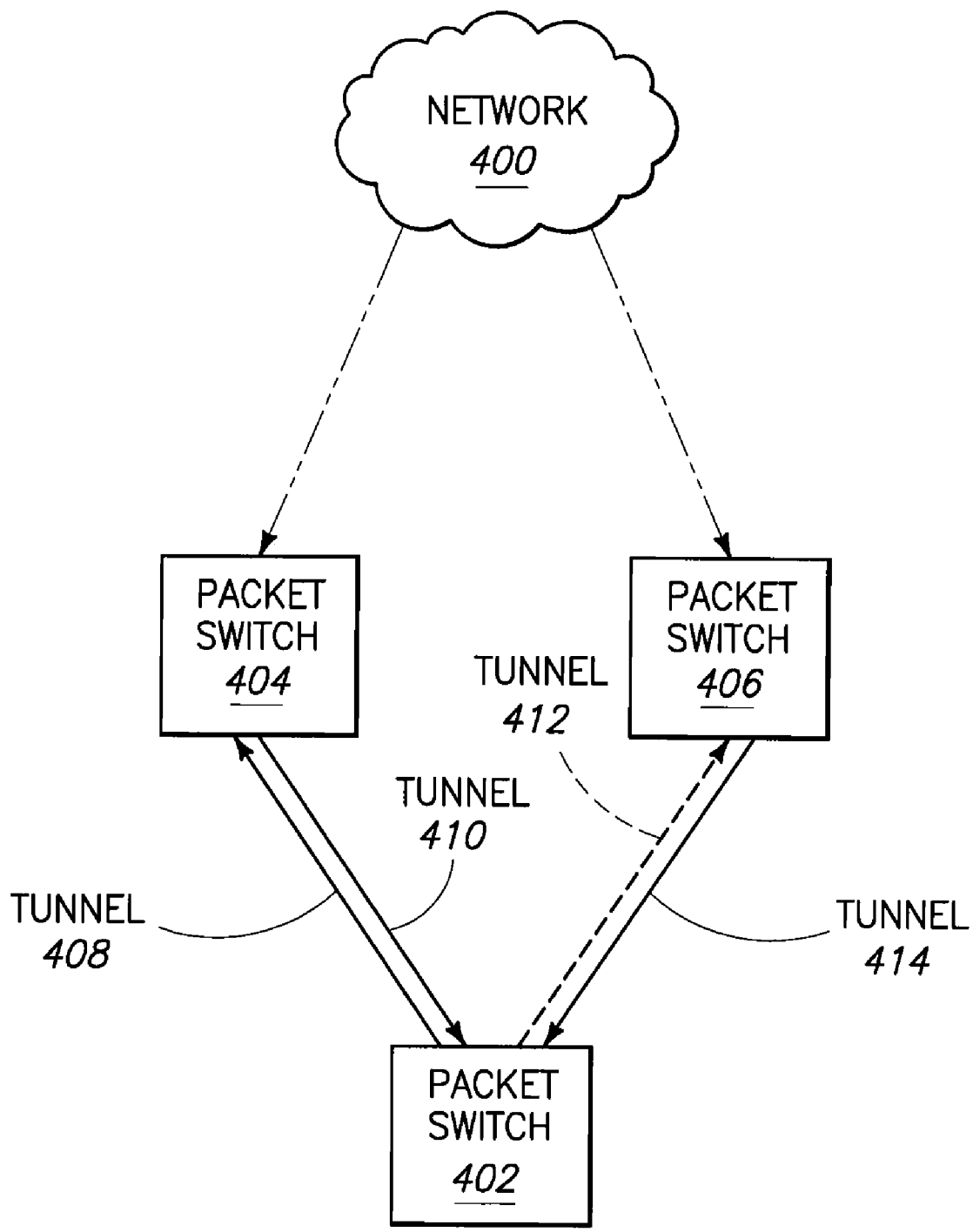
FIG. 4 illustrates a fourth packet switch network.

FIG. 4 illustrates a packet switch network 400. Packet switch network 400 includes packet switches 402, 404, and 406. Packet switch network 400 also includes four tunnels 408, 410, 412, and 414. Tunnels 408 and 412 may be associated with each other. Accordingly, when tunnel 408 is active, tunnel 412 may be inactive and when tunnel 412 is active tunnel 408 may be inactive. Tunnel 408 may be a primary tunnel and tunnel 412 may be a backup tunnel.

Packet switch 402 may forward non-control packets via tunnel 408 or via tunnel 412, but not via both tunnels simultaneously. However, control packets, such as CCM messages, may be sent via both tunnels 408 and 412 even if one of the two tunnels is inactive.

The tunnels of packet switch network 400 are unidirectional. Tunnel 408 relays packets only from packet switch 402 to packet switch 404 and tunnel 410 relays packets only in the opposite direction from packet switch 404 to packet switch 402. Tunnel 412 relays packets only from packet switch 402 to packet switch 406 and tunnel 414 relays packets only in the opposite direction from packet switch 406 to packet switch 402.

Tunnels 408 and 412 are associated with each other since only one of tunnels 408 and 412 may be active at a time. In contrast, tunnels 410 and 414 are not associated with each other. Tunnels 410 and 414 are both primary tunnels, neither of which has an associated backup tunnel. Accordingly, if tunnel 410 becomes non-operational, packet switch 404 may not relay packets to packet switch 402.

The combination of tunnels 408 and 410 enables communication between packet switches 402 and 404 and the combination of tunnels 412 and 414 enables communication between packet switches 402 and 406. However, note that packet switch 402 may send non-control packets to either packet switch 404 or packet switch 406, but not to both since only one of tunnels 408 and 412 will be active at a time. In contrast, packet switch 406 may send packets to packet switch 402 via tunnel 414 at any time regardless of the status of tunnel 412 and packet switch 404 may send packets to packet switch 402 via tunnel 410 at any time regardless of the status of tunnel 408.

Tunnel 410 may be complementary to tunnel 408 in that these two tunnels relay packets between the same two packet switches (packet switches 402 and 404) but in opposite directions. Furthermore, tunnels 408 and 410 may be complementary in that tunnel 408 may be used to relay packets indicating the status of tunnel 410 and vice versa.

For example, packet switch 402 may send CCM messages to packet switch 404 via tunnel 408. Packet switch 404, upon receiving the CCM messages, may monitor the CCM messages to be sure that no CCM messages are lost. If packet switch 404 detects that it has not received a configurable number of CCM messages corresponding to a CCM loss interval from packet switch 402 via tunnel 408, packet switch 404 may send a CCM message via tunnel 410 having a remote defect indication. Upon receiving the CCM message containing the remote defect indication from packet switch 404, packet switch 402 may determine that tunnel 408 is no longer operational and in response may deactivate tunnel 408.

Of course, a similar configuration could be established for tunnel 410 whereby packet switch 404 sends CCM messages to packet switch 402 via tunnel 410, packet switch 402 monitors the CCM messages, and packet switch 402 sends a CCM message having a remote defect indication to packet switch 404 via tunnel 408 if packet switch 402 detects that a CCM loss interval has expired without receiving a CCM from packet switch 404. In a similar manner, tunnels 412 and 414 may be complementary.

In some configurations, the packet switches of packet switch network 400 may be configured to drop (discard) packets received on tunnels designated as inactive. For example if packet switch 406 has designated tunnel 412 as inactive, packet switch 406 may drop non-control packets received from tunnel 412 since tunnel 412 is an inactive tunnel that should not be relaying packets other than control packets.

Figure 5:
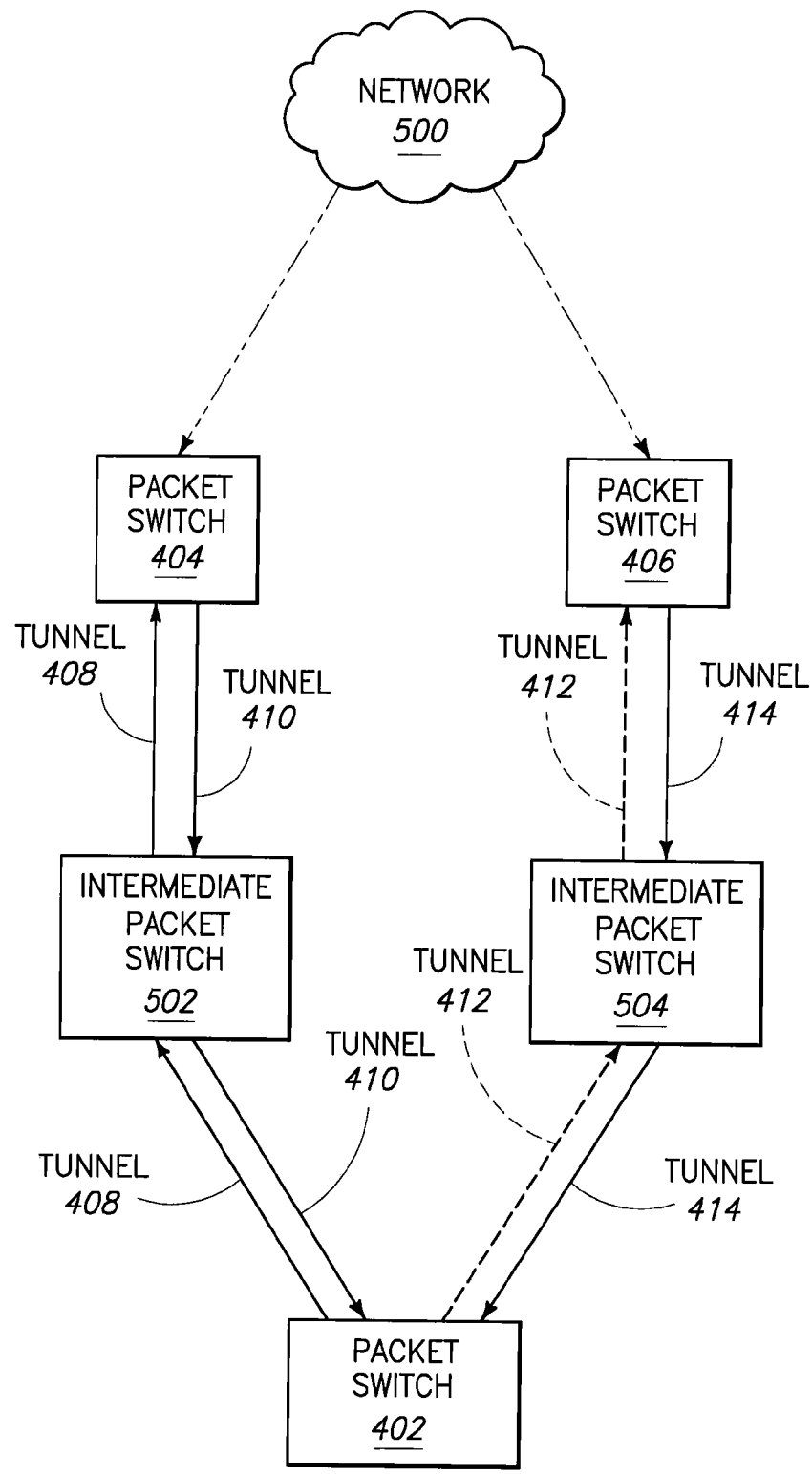
FIG. 5 illustrates a packet switch with two intermediate packet switches.

In some configurations, intermediate packet switches may facilitate tunnels 408, 410, 412, and 414. FIG. 5 illustrates a packet switch network 500 having intermediate packet switches. Packet switch network 500 includes packet switches 402, 404, and 406, and tunnels 408, 410, 412, and 414 of packet switch network 400. In addition, packet switch network 500 includes two intermediate packet switches 502 and 504. Intermediate packet switch 502 facilitates tunnels 408 and 410. For example, intermediate packet switch 502 may receive packets sent by packet switch 402 via a first portion of tunnel 408, and may forward the packets to packet switch 404 via a second portion of tunnel 408. Similarly, intermediate packet switch 504 facilities tunnels 412 and 414. Of course, other intermediate packet switches (not illustrated) may also facilitate tunnels 408, 410, 412, and 414.

Figure 6:
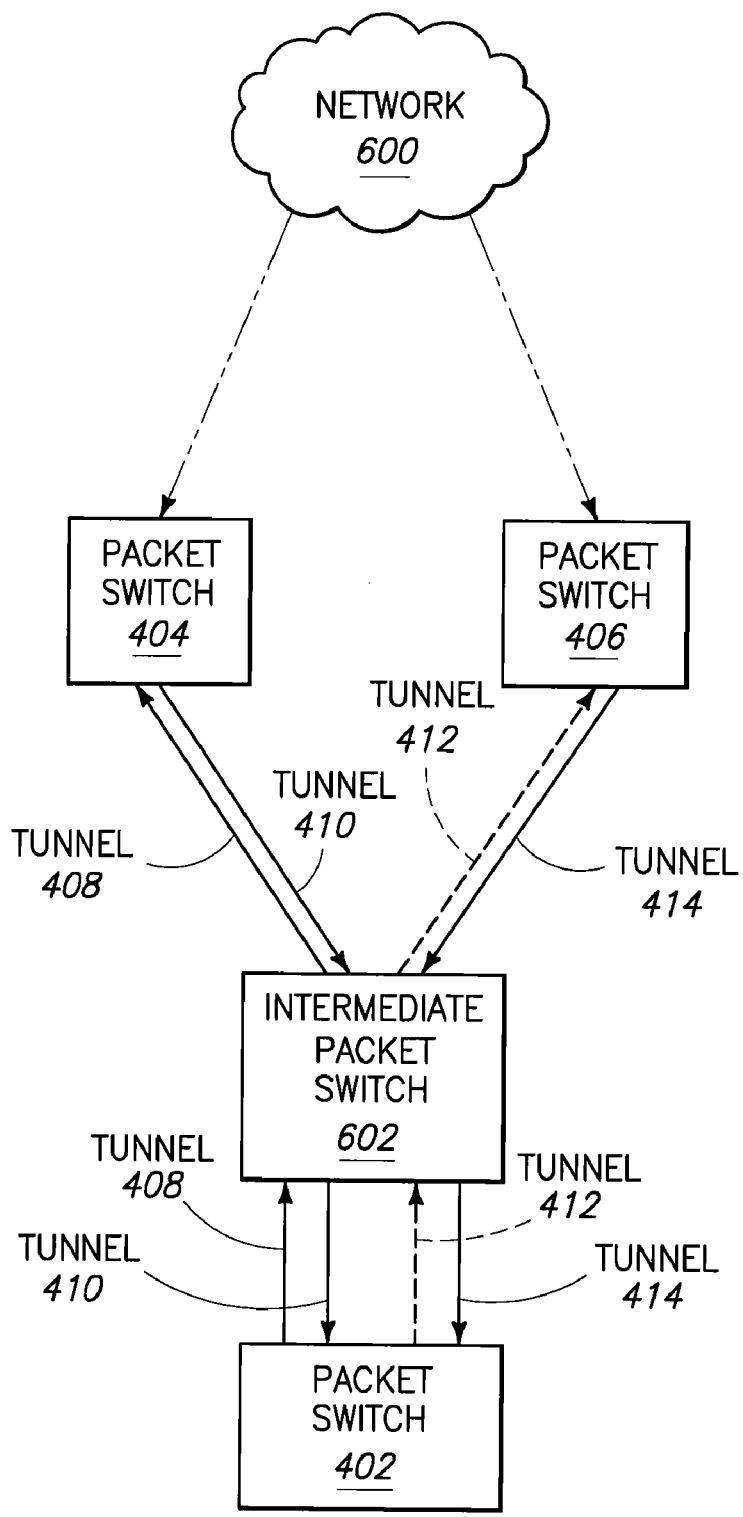
FIG. 6 illustrates a packet switch with one intermediate packet switch.

FIG. 6 illustrates a packet switch network 600 having a single intermediate packet switch. Packet switch network 600 includes packet switches 402, 404, and 406, and tunnels 408, 410, 412, and 414 of packet switch network 400. In addition, packet switch network 600 includes intermediate packet switch 602 which facilities tunnels 408, 410, 412, and 414. In this configuration, packet switch 402 may be connected to intermediate packet switch 602 via a first port which facilities tunnels 408, 410, 412, and 414. However, intermediate packet switch 602 may be connected to packet switch 404 via a second port, and to packet switch 406 via a third port.

Although the primary tunnels described above have been described as having a single backup tunnel, multiple backup tunnels may be associated with a single primary tunnel. FIG. 7 illustrates a packet switch network 700 having two backup tunnels associated with a single primary tunnel. Packet switch network 700 includes packet switch 402, 404, and 406, and tunnels 408 and 412 of packet switch network 400. In addition, packet switch network 700 includes packet switch 702 and tunnel 704. Tunnel 704 couples packet switch 402 to packet switch 702.

Tunnel 704 is an additional backup tunnel associated with tunnels 408 and 412. In this configuration, one of tunnels 408, 412, and 704 may be active at a time, the other tunnels being inactive. For example if tunnel 408 is active, tunnels 412 and 704 are inactive, or if tunnel 704 is active, tunnels 408 and 412 are inactive. Tunnel 704 provides additional redundancy beyond that offered by having two tunnels (a primary and a single backup). For example if both tunnels 408 and 412 are non-operational, communication may still take place via tunnel 704.

According to another aspect of the invention, a network operating method includes relaying a first packet from a packet switch to a first one of a plurality of destination packet switches via two or more different tunnels in a first combination. The method also includes deactivating one of the tunnels of the first combination without deactivating any other tunnel of the first combination. Deactivating the one tunnel may include preventing packets other than control packets from being forwarded by the deactivated tunnel. After deactivating the one tunnel of the first combination, a second packet is relayed from the packet switch to a second one of the plurality of destination packet switches via two or more different tunnels in a second combination.

The first packet may include an Ethernet customer destination address and an Ethernet backbone destination address. The first packet may be relayed via the first combination without modifying the customer destination address of the first packet although the backbone destination address of the first packet may be altered for individual ones of the tunnels of the first combination. In relaying the first packet via the first combination, the method might not alter a layer-three (network layer) destination address of the first packet.

In some configurations, the first one of the plurality of destination packet switches and the second one of the plurality of destination packet switches may be a same packet switch. In other configurations, the first one of the plurality of destination packet switches and the second one of the plurality of destination packet switches may be different packet switches.

The first combination and the second combination may have at least one tunnel in common. Alternatively, the first combination and the second combination might not have any tunnels in common. The first combination may consist of two active primary tunnels and the second combination may consist of an active primary tunnel and an active backup tunnel. The first combination of tunnels and the second combination of tunnels may relay packets conforming to the IEEE 802.1ah standard.

FIG. 8 illustrates a packet switch network 800. Packet switch network 800 includes packet switches 402, 404, and 406, and tunnels 408, 410, 412, and 414 of packet switch network 400. In addition, packet switch network 800 includes packet switches 802 and 804.

Packet switch network 800 also includes additional tunnels 806, 808, 810, 812, 814, 816, 818, and 820. Tunnel 806 relays packets from packet switch 404 to packet switch 802, and tunnel 808 relays packets from packet switch 404 to packet switch 804. Like tunnels 408 and 412, tunnels 806 and 808 are associated with each other. In other words, only one of tunnels 806 and 808 is active at a time. Tunnel 814 relays packets from packet switch 802 to packet switch 404 and is complementary to tunnel 806 in a manner similar to complementary tunnels 408 and 410 discussed above. Similarly, tunnel 818 is complementary to tunnel 808.

Furthermore, tunnel 810 relays packets from packet switch 406 to packet switch 804, and tunnel 812 relays packets from packet switch 406 to packet switch 802. Like tunnels 408 and 412, tunnels 810 and 812 are associated with each other. In other words, only one of tunnels 810 and 812 is active at a time. Tunnel 816 relays packets from packet switch 804 to packet switch 406 and is complementary to tunnel 810. Similarly, tunnel 820 is complementary to tunnel 812.

The tunnels of packet switch network 800 may be utilized to relay packets from packet switch 402 to either packet switch 802 or packet switch 804. For example, packet switch 402 may send packets to packet switch 802 via a combination of tunnels 408 and tunnel 806 if both tunnels 408 and 806 are active. Alternatively, if tunnel 408 is inactive, packet switch 402 may send packets to packet switch 804 via a combination of tunnels 412 and 810.

Packet switches 802 and 804 may be connected to a common packet switch or to a common network, as was described above in relation to FIGS. 2 and 3. Accordingly, packet switch 402 may send packets to the common packet switch or the common network via either packet switch 802 or packet switch 804.

In some packet switch networks, such as large access networks, the tunnel configuration described above may be particularly advantageous. For example, in a large access network, packet switches 802 and 804 may be packet switches having a large amount of switching capacity that are placed at the core of the access network. Packet switches 802 and 804 may aggregate packets from many packet switches having a medium amount of switching capacity coupled to packet switches 802 and 804 such as packet switches 404 and 406.

Despite the fact that packet switches 802 and 804 are illustrated in FIG. 8 as being coupled to two packet switches, packet switches 404 and 406, packet switches 802 and 804 may be coupled to more than two medium capacity switches in the access network. For example, in some access networks, the number of medium capacity switches coupled via tunnels to packet switches 802 and 804 may be greater than twenty.

Medium capacity packet switches 404 and 406 may aggregate packets from a large number of low capacity packet switches such as packet switch 402. The low capacity packet switches may be coupled to subscriber networks and in some cases may be customer premises equipment.

Although packet switches 404 and 406 are illustrated in FIG. 8 as being coupled to only one low capacity packet switch, packet switch 402, packet switches 404 and 406 may be coupled to more than one low capacity switch in the access network. For example, in some access networks, the number of low capacity switches coupled via tunnels to packet switches 404 and 406 may be greater than ten.

In the access network described above, the tunnel configuration of FIG. 8 may help to reduce the number of tunnel deactivations and tunnel activations that take place in response to a particular tunnel becoming non-operational. For example, if a physical link connecting packet switch 802 to packet switch 404 fails, tunnels facilitated by the physical link, such as tunnels 806 and 814 may become non-operational. Accordingly, tunnel 806 may be deactivated and tunnel 808 may be activated.

The failed physical link may also affect other tunnels facilitated by the physical link such as tunnels between other medium capacity packet switches (described above) that may be coupled to packet switch 802. Consequently, a number of medium capacity packet switches may alter their tunnel configurations in response to the failed physical link.

However, the failure of the physical link might not result in tunnel configuration changes in the low capacity packet switches such as packet switch 402. For example, packet switch 402 may continue sending packets to packet switch 404 via primary tunnel 408 even if tunnel 806 is non-operational. Rather than forwarding these packets to packet switch 802 via tunnel 806, packet switch 404 may forward these packets to packet switch 804 via tunnel 808. Accordingly, packet switch 402 need not reconfigure tunnel 408 to be inactive in response to tunnel 806 being deactivated.

Not having to reconfigure tunnels on the low capacity packet switches may be advantageous because reconfiguring tunnels, in some cases, may result in packets being dropped by the low capacity packet switches while the low capacity packet switches are performing tunnel reconfiguration. Accordingly, using a combination of tunnels to relay packets from a low capacity packet switch, such as packet switch 402, to a high capacity packet switch, such as packet switch 802, may reduce the number of packet switches that perform tunnel reconfiguration due to a physical link failure (or other failure) when compared with a packet switch network using a single tunnel (instead of a combination of two or more tunnels) to relay packets from a low capacity packet switch, such as packet switch 402, to a high capacity packet switch, such as packet switch 802.

Similarly, a failure affecting a tunnel coupling a low capacity packet switch such as packet switch 402 to a medium capacity packet switch, such as packet switch 404 may result in tunnel configuration changes in the low capacity packet switch and the medium capacity packet switch, but might not result in a tunnel configuration change in a high capacity packet switch such as packet switch 802.

For example, if tunnel 408 becomes non-operational, packet switches 404 and 402 may configure tunnel 408 to be inactive. However, the fact that tunnel 408 is non-operational need not result in a tunnel configuration change in packet switches 802 or 804 since packets may be relayed from packet switch 402 to packet switch 804 via tunnel 412 (which is configured by packet switches 406 and 402 to be active as a result of tunnel 408 being deactivated) and tunnel 810 (which was active prior to tunnel 408 becoming non-operational and continues to be active).

In relaying packets via the tunnels, the packet switches of packet switch network 800, may relay the packets at the data link layer (layer two) of the open systems interconnection model. Consequently, portions of a packet forwarded from packet switch 402 to packet switch 802 via tunnels 408 and 806 might not be altered along the way. In particular, a layer-two customer destination address (C-DA) of the packet might not be changed as the packet is relayed from packet switch 402 to packet switch 802.

Although the C-DA might not change, the position of the C-DA within the packet might change. In some configurations, packet switch 402 may add a transport identifier associated with tunnel 408 to a packet before sending the packet to packet switch 404 via tunnel 408. Upon receiving the packet, packet switch 404 may replace the transport identifier with a different transport identifier associated with tunnel 806 prior to forwarding the packet to packet switch 802 via tunnel 806. The addition, modification, replacement, or removal of any transport identifiers might not affect the C-DA, the network layer address of the packet, other layer-three portions of the packet, or other higher layer portions of the packet. However, the position of these fields within the packet might change due to the addition, modification, replacement, or removal of the transport identifiers.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

The invention claimed is:

1. A network operating method comprising:
   relaying a first packet from a packet switch to a first one of a plurality of destination packet switches using two or more different tunnels of a first combination of tunnels and using one or more intermediate packet switches connecting the two or more different tunnels of the first combination of tunnels;

deactivating one of the tunnels of the first combination without deactivating any other tunnel of the first combination; and after deactivating the one tunnel of the first combination, relaying a second packet from the packet switch to a second one of the plurality of destination packet switches using two or more different tunnels of a second combination of tunnels and using one or more intermediate packet switches connecting the two or more different tunnels of the second combination of tunnels;

wherein the first packet includes a first transport identifier conforming to the IEEE 802.1ah standard, the first transport identifier including a first backbone destination address (B-DA) and the second packet includes a second transport identifier conforming to the IEEE 802.1ah standard, the second transport identifier including a second B-DA, the second B-DA being different from the first B-DA; and wherein the first transport identifier comprises a backbone virtual local area network identifier (B-VID) having a first value and the second transport identifier also comprises the B-VID having the first value.

2. The method of claim 1 wherein a layer-three (network layer) destination address of the first packet is not altered by any of the tunnels of the first combination.

3. The method of claim 1 wherein:
the first packet comprises an Ethernet customer destination address and an Ethernet backbone destination address; and
relaying the first packet comprises altering the backbone destination address for individual ones of the tunnels of the first combination and relaying the first packet via the first combination without modifying the customer destination address.

4. The method of claim 1 wherein the deactivating the one tunnel comprises preventing packets other than control packets from being forwarded by the deactivated tunnel.

5. The method of claim 1 wherein the first one of the plurality of destination packet switches and the second one of the plurality of destination packet switches are a same packet switch.

6. The method of claim 1 wherein the first one of the plurality of destination packet switches and the second one of the plurality of destination packet switches are different packet switches.

7. The method of claim 6 wherein:
a tunnel that relays the first packet to the first one of the plurality of destination packet switches terminates on the first one of the plurality of destination packet switches; and
a tunnel that relays the second packet to the second one of the plurality of destination packet switches terminates on the second one of the plurality of destination packet switches.

8. The method of claim 1 wherein the first combination and the second combination have at least one tunnel in common.

9. The method of claim 1 wherein the first combination and the second combination do not have any tunnels in common.

10. The method of claim 1 wherein the first combination consists of two active primary tunnels and the second combination consists of an active primary tunnel and an active backup tunnel.

11. The method of claim 1 wherein the first combination of tunnels and the second combination of tunnels relay packets conforming to the IEEE 802.1ah standard.

12. A packet switch network configured to implement the method of claim 1.

13. A packet switch operating method comprising:
forwarding a first packet to a first packet switch via an active first primary tunnel terminating on the first packet switch, the first primary tunnel being associated with an inactive backup tunnel terminating on a different second packet switch, the active first primary tunnel relaying packets only in a single direction;
deactivating the first primary tunnel;
activating the backup tunnel;
forwarding a second packet to the second packet switch via the activated backup tunnel;
prior to the deactivating the first primary tunnel, preventing the backup tunnel from forwarding packets other than control packets;
receiving one or more packets from the first packet switch via a second primary tunnel relaying packets only in a single direction away from the first packet switch;
after receiving the one or more packets and prior to the deactivating the first primary tunnel, determining, based on contents of the one or more packets, that either the first primary tunnel or the second primary tunnel is nonoperational; and
wherein the deactivating of the first primary tunnel comprises deactivating based on the contents of the one or more packets and wherein the second primary tunnel remains active despite the deactivation of the primary tunnel.

14. The method of claim 13 wherein the control packets comprise Ethernet continuity check messages (CCMs) conforming to the Institute of Electrical and Electronics Engineers (IEEE) 802.1ag standard.

15. The method of claim 13 wherein the one or more packets are CCMs.

16. The method of claim 15 wherein:
the one or more received CCMs include remote defect indications; and
the determining comprises determining that the first primary tunnel is nonoperational.

17. The method of claim 15 wherein the deactivating of the primary tunnel comprises deactivating in response to receiving the one or more CCMs.

18. The method of claim 13 wherein the deactivating comprises preventing packets other than control packets from being forwarded via the primary tunnel.

19. The method of claim 13 wherein both the first packet and the second packet comprise a same Ethernet customer destination address (C-DA).

20. The method of claim 13 wherein during periods of time when the primary tunnel is active, the backup tunnel is inactive and during periods of time when the backup tunnel is active, the primary tunnel is inactive.

21. The method of claim 13 wherein the first packet comprises a first transport identifier associated with the primary tunnel and the second packet comprises a second transport identifier associated with the backup tunnel.

22. The method of claim 21 wherein the first transport identifier and the second transport identifier individually comprise one of at least one Virtual Local Area Network (VLAN) identifier, at least one Multiprotocol Label Switching (MPLS) label, a provider bridging (PB) identifier, a provider backbone bridging (PBB) identifier, a provider backbone transport (PBT) identifier, a provider backbone bridging traffic engineering (PBB-TE) identifier, and a Virtual Private LAN Service (VPLS) identifier.

23. The method of claim 13 wherein the first packet includes a first transport identifier conforming to the IEEE 802.1ah standard, the first transport identifier including a first backbone destination address (B-DA) and the second packet includes a second transport identifier conforming to the IEEE 802.1ah standard, the second transport identifier including a second B-DA, the second B-DA being different from the first B-DA.

24. The method of claim 23 wherein the first transport identifier and the second transport identifier are identical except for the first B-DA and the second B-DA.

25. The method of claim 23 wherein the first transport identifier comprises a backbone virtual local area network identifier (B-VID) having a first value and the second transport identifier also comprises the B-VID having the first value.

26. A packet switch configured to implement the method of claim 13.

27. A packet switch network comprising:
   a first packet switch;
   a second packet switch;
   a third packet switch;
   a primary tunnel having two endpoints, one of the endpoints being located on the first packet switch and the other of the endpoints being located on the second packet switch, the primary tunnel relaying packets between the first packet switch and the second packet switch;
   a backup tunnel associated with the primary tunnel, the backup tunnel having two endpoints, one of the endpoints being located on the first packet switch and the other of the endpoints being located on the third packet switch, the backup tunnel relaying packets between the first packet switch and the third packet switch and wherein the backup tunnel is active when the primary tunnel is inactive and inactive when the primary tunnel is active;
   wherein the primary tunnel relays only packets having a first transport identifier conforming to the IEEE 802.1ah standard including a first backbone destination address (B-DA) and the backup tunnel relays only packets having a second transport identifier conforming to the IEEE 802.1ah standard including a second B-DA, the first B-DA being different than the second B-DA; and
   wherein the first transport identifier comprises a backbone virtual local area network identifier (B-VID) having a first value and the second transport identifier also comprises the B-VID having the first value.

28. The packet switch network of claim 27 wherein the primary tunnel and the backup tunnel forward only control packets when inactive.

29. The packet switch network of claim 27 wherein the primary tunnel and the backup tunnel forward control packets and packets other than control packets when active.

30. The packet switch network of claim 27 wherein the first transport identifier and the second transport identifier are identical except for the first B-DA and the second B-DA.

31. The packet switch network of claim 27 wherein the primary tunnel is configured to prevent packets relayed by the primary tunnel from exiting the primary tunnel at a packet switch other than the second packet switch.

32. The packet switch network of claim 27 further comprising one or more intermediate packet switches configured to relay the primary tunnel between the first packet switch and the second packet switch without terminating the primary tunnel.

33. The packet switch network of claim 27 wherein the backup tunnel is a first backup tunnel and further comprising:
   a fourth packet switch; and
   a second backup tunnel associated with the primary tunnel and the first backup tunnel, the second backup tunnel having two endpoints, one of the endpoints being located on the first packet switch and the other of the endpoints being located on the fourth packet switch, the second backup tunnel being configured to relay packets between the first packet switch and the fourth packet switch wherein the second backup tunnel is configured to be active when the primary tunnel and the first backup tunnel are inactive and to be inactive when either the primary tunnel or the first backup tunnel is active.

34. The packet switch network of claim 27 wherein the primary tunnel is a first primary tunnel, the backup tunnel is a first backup tunnel, and further comprising:
   a fourth packet switch;
   a fifth packet switch;
   a second primary tunnel having two endpoints, one of the endpoints being located on the second packet switch and the other of the endpoints being located on the fourth packet switch, the second primary tunnel relaying packets from the second packet switch to the fourth packet switch;
   a second backup tunnel having two endpoints, one of the endpoints being located on the second packet switch and the other of the endpoints being located on the fifth packet switch, the second backup tunnel relaying packets from the second packet switch to the fifth packet switch;
   a third primary tunnel having two endpoints, one of the endpoints being located on the third packet switch and the other of the endpoints being located on the fifth packet switch, the third primary tunnel relaying packets from the third packet switch to the fifth packet switch;
   a third backup tunnel having two endpoints, one of the endpoints being located on the third packet switch and the other of the endpoints being located on the fourth packet switch, the third backup tunnel relaying packets from the third packet switch to the fourth packet switch; and
   wherein the second packet switch forwards packets received from the first primary tunnel to the second primary tunnel if the second primary tunnel is active and forwards packets received from the first primary tunnel to the second backup tunnel if the second backup tunnel is active and the third packet switch forwards packets received from the first backup tunnel to the third primary tunnel if the third primary tunnel is active and forwards packets received from the first backup tunnel to the third backup tunnel if the third backup tunnel is active.

35. A packet switch network comprising:
   a first packet switch;
   a second packet switch;
   a third packet switch;
   a primary tunnel having two endpoints, one of the endpoints being located on the first packet switch and the other of the endpoints being located on the second packet switch, the primary tunnel relaying packets between the first packet switch and the second packet switch;
   a backup tunnel associated with the primary tunnel, the backup tunnel having two endpoints, one of the endpoints being located on the first packet switch and the other of the endpoints being located on the third packet switch, the backup tunnel relaying packets between the first packet switch and the third packet switch and wherein the backup tunnel is active when the primary tunnel is inactive and inactive when the primary tunnel is active; and wherein the primary tunnel is a first primary tunnel, the first primary tunnel relaying packets only in a single direction from the first packet switch to the second packet switch and further comprising:

a second primary tunnel associated with the first primary tunnel, the second primary tunnel having two endpoints, one of the endpoints being located on the first packet switch and the other of the endpoints being located on the second packet switch, the second primary tunnel relaying packets only in a single direction from the second packet switch to the first packet switch, wherein the second primary tunnel is active when the first primary tunnel is active and active when the first primary tunnel is inactive; and a third primary tunnel associated with the backup tunnel, the third primary tunnel having two endpoints, one of the endpoints being located on the first packet switch and the other of the endpoints being located on the third packet switch, the third primary tunnel relaying packets only in a single direction from the third packet switch to the first packet switch, wherein the third primary tunnel is active when the backup tunnel is active and active when the backup tunnel is inactive;

wherein the second packet switch transmits packets to the first packet switch via the second primary tunnel in response to receiving packets from the first packet switch via the first primary tunnel; and wherein the third packet switch transmits packets to the first packet switch via the third primary tunnel in response to receiving packets from the first packet switch via the backup tunnel.

36. The packet switch network of claim 35 wherein the first primary tunnel and the second primary tunnel are both associated with a first IEEE 802.1ag connectivity fault management (CFM) service in the first packet switch and the backup tunnel and the third primary tunnel are both associated with a second IEEE 802.1ag CFM service in the first packet switch.

* * * * *